United States Patent [19]

Nakanishi

[11] Patent Number: 4,790,184

[45] Date of Patent: Dec. 13, 1988

[54] OIL GAUGE FOR CARTRIDGE-TYPE OIL TANK

[75] Inventor: Yutaka Nakanishi, Aichi, Japan

[73] Assignee: Toyotomi Kogyo Co., Ltd., Aichi, Japan

[21] Appl. No.: 60,800

[22] Filed: Jun. 12, 1987

[30] Foreign Application Priority Data

Jun. 13, 1986 [JP] Japan ................. 61-138725

[51] Int. Cl.$^4$ ............................. G01F 23/58
[52] U.S. Cl. ............................ 73/317; 116/229
[58] Field of Search ............... 73/317, 307; 116/229

[56] References Cited

U.S. PATENT DOCUMENTS

| 3,536,032 | 10/1970 | Ridding | 116/229 |
| 4,038,507 | 7/1977 | Murphy, Jr. et al. | 73/317 |
| 4,574,631 | 3/1986 | Johnson, Jr. | 73/317 |

FOREIGN PATENT DOCUMENTS

| 0564218 | 12/1923 | France | 73/317 |
| 96329 | 6/1986 | Japan . | |
| 97729 | 6/1986 | Japan . | |
| 101232 | 6/1986 | Japan . | |

Primary Examiner—Daniel M. Yasich
Attorney, Agent, or Firm—Pollock, Vande Sande & Priddy

[57] ABSTRACT

An oil gauge for a cartridge-type oil tank capable of quantitatively indicating the amount of oil in the tank both during use of the tank and when oil is fed to the tank, while providing the tank with airtightness. The oil gauge includes a transparent cover plate arranged on a side wall of the tank so as to airtightly cover an opening in the side wall of the tank. A gauge base is mounted on an inside of the cover plate. On the gauge base are pivotally mounted an arm rod which is provided with a float and an oil indicator having a scale for quantitatively indicating the amount of oil in the tank. The scale is visible through the transparent cover plate. The oil gauge also includes a pair of stoppers arranged on opposite sides of the arm rod such that one stopper pivotally varies the position of the oil indicator with variations in oil level when the tank is in a working position and the other stopper pivotally varies the position of the oil indicator with variations in oil level when the tank is inverted and placed in an oil feed position.

8 Claims, 5 Drawing Sheets

FIG. 1A
PRIOR ART
FIG. 1B
PRIOR ART
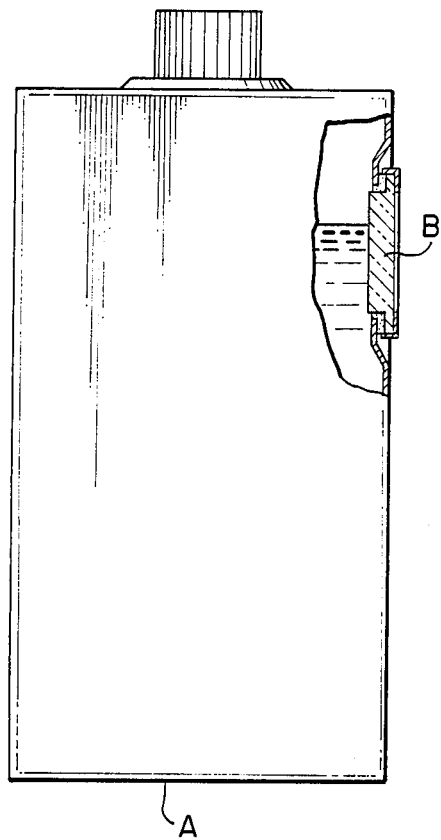
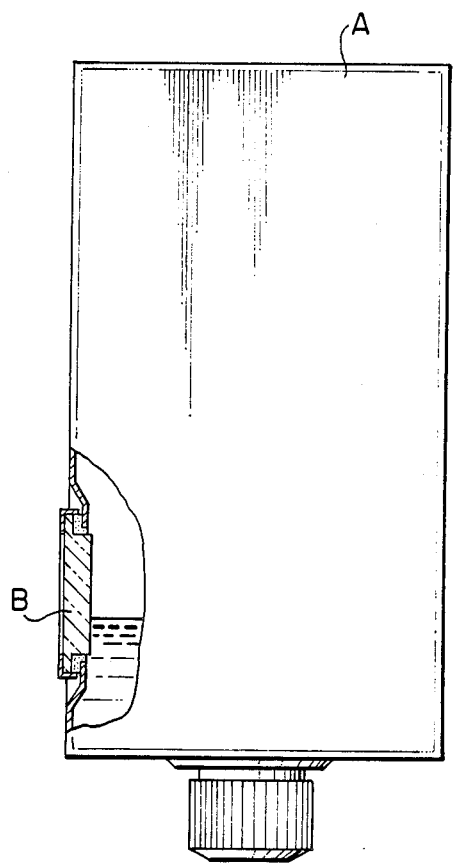

OIL GAUGE FOR CARTRIDGE-TYPE OIL TANK

BACKGROUND OF THE INVENTION

1. Field of the Invention

This invention relates to an oil gauge for a cartridge-type oil tank, and more particularly to an oil gauge for a cartridge-type oil tank which is used for an oil burner or the like.

2. Description of the Prior Art

An oil tank which has been conventionally used for an oil burner or the like is generally classified into two types or a cartridge-type and an open-type. A cartridge-type oil tank is used in an inverted manner, resulting in negative pressure being constantly applied to an interior of the cartridge-type oil tank during the use. Accordingly, the deterioration of airtightness of the tank causes leakage of oil stored in the cartridge-type oil tank. Thus, arrangement of an oil gauge in the oil tank must be carefully carried out while ensuring airtightness of the tank. Also, an oil gauge for a cartridge-type oil tank is required to indicate the amount of oil int he tank both when use of the tank and during oil is fed tot he tank. In view of such requirements, a conventional oil gauge for a cartridge-type oil tank is typically constructed as shown in FIGS. 1A and 1B wherein FIG. 1A shows a cartridge-type oil tank to which oil feed has been completed and FIG. 1B shows the tank which has become substantially empty during the use. As shown in FIGS. 1A and 1B the conventional oil gauge substantially comprises only a transparent window A provided on a side wall of the cartridge-type oil tank B, through which a level of oil in the tank is viewed.

The conventional oil gauge has a disadvantage of failing to indicating the actual amount of oil stored in a cartridge-type oil tank although it acts as a qualitative oil indicator both during use of the tank and during oil feed to the tank.

In view of such a disadvantage, the inventor proposed an oil gauge for a cartridge-type oil tank as disclosed in Japanese Utility Model Application Nos. 182563/1984, 182564/1984 and 182565/1984 which were filed on Nov. 30, 1984, assigned to the assignee, and laid-open to public inspection on June 30, 1986 under Japanese Utility Model Application Laying-Open Publication Nos. 101232/1986, 96329/1986 and 97729/1986, respectively. The oil gauge taught in Japanese utility Model Application No. 182563/1984 is constructed in a manner to mount a pointer on an arm rod and vertically move an indicator plate by gravity. However, the oil gauge fails to ensure its smooth operation due to a failure in preventing entrance of dust or the like therein. In the oil gauge disclosed in Japanese Utility Model Application No. 182564/1984, an arm rod and an indicator are pivotally mounted on a gauge base so as to be pivotable in a cartridge-type oil tank and the indicator is moved in relation to the arm rod by means of a stopper means provided on the arm rod. However, the oil gauge is insufficient in strength because the arm rod and indicator each are supported in a manner like a cantilever. Also, it has another disadvantage that its parts must be manufactured with high precision, to thereby significantly increase the manufacturing cost. Thus, the oil gauge failed to be put to practical use. The oil gauge taught in Japanese Utility Model Application No. 182565/1984 is so constructed that an indicator is mounted on an arm rod and provided with two scales or a first scale used during the use and a second one used when oil is fed to a cartridge-type oil tank. Unfortunately, the oil gauge has a disadvantage of failing to prevent entrance of dust or the like therein, to thereby deteriorate its smooth operation, like that taught in Japanese Utility Model Application No. 182563/1984 described above.

Accordingly, it would be highly desirable to develop an oil gauge for a cartridge-type oil tank which is capable of positively indicating the actual amount of oil in the cartridge-type oil tank with a simple structure while ensuring airtightness for both the oil tank and oil gauge and providing the oil gauge with rigidity or sufficient mechanical strength

SUMMARY OF THE INVENTION

Generally speaking, in accordance with the present invention, an oil gauge for a cartridge-type oil tank is provided. The oil gauge is adapted to be arranged in the cartridge-type oil tank through an opening formed at a substantially central portion of a side wall of the cartridge-type oil tank to quantitatively indicate the amount of oil in the cartridge-type oil tank both during the use of the cartridge-type oil tank and when oil is fed thereto. The oil gauge includes a transparent cover plate arranged on the side wall of the cartridge-type oil tank so as to airtightly cover the opening of the tank. On an inside of the transparent cover plate a gauge base is securely mounted, on which an arm rod is pivotally mounted at a proximal end thereof. The arm rod is provided at a distal end thereof with a float, so that it may be pivotally moved about the distal end thereof by the float depending on a variation in a level of oil in the cartridge-type oil tank. On the gauge base is also pivotally mounted an oil indicator at one end thereof, which is provided with an indication means for quantitatively indicating the amount of oil in the cartridge-type oil tank depending on a level of oil in the cartridge-type oil tank. The indication means is arranged to be visible through the transparent cover plate irrespective of a level of oil in the cartridge-type oil tank. The indication means may comprise a scale. The arm rod is provided with an actuation means which is constantly engaged with the oil indicator so as to pivotally vary a position of the oil indicator depending on a variation in a level of oil in the cartridge-type oil tank, to thereby vary a position of the indication means.

Accordingly, it is an object of the present invention to provide an oil gauge for a cartridge-type oil burner which is capable of positively indicating the actual amount of oil in the cartridge-type oil tank with a simple structure.

It is another object of the present invention to provide an oil gauge for a cartridge-type oil tank which is capable of providing both the oil tank and oil gauge with airtightness to prevent leakage of oil from the cartridge-type oil tank.

It is a further object of the present invention to provide an oil gauge for a cartridge-type oil burner which is capable of exhibiting sufficient rigidity or mechanical strength.

It is still another object of the present invention to provide an oil gauge for a cartridge-type oil tank which is capable of positively indicating the amount of oil in the cartridge-type oil tank both during the use of the tank and when oil is fed to the tank.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawing, wherein FIGS. 1A and 1B a front elevation views partly in section showing a conventional oil gauge for a cartridge-type oil tank, in which FIG. 1A shows a cartridge-type oil tank erected for oil feed thereto and FIG. 1B shows the tank used in an inverted manner;

DETAILED DESCRIPTION OF THE PREFERRED EMBODIMENT

Now, an oil gauge for a cartridge-type oil tank according to the present invention will be described hereinafter with reference to the accompanying drawings.

An oil gauge according to the present invention is applicable to various kinds of appliances for which a cartridge-type oil tank is used, such as an oil burner, a motorcycle and the like.

Figure 2:
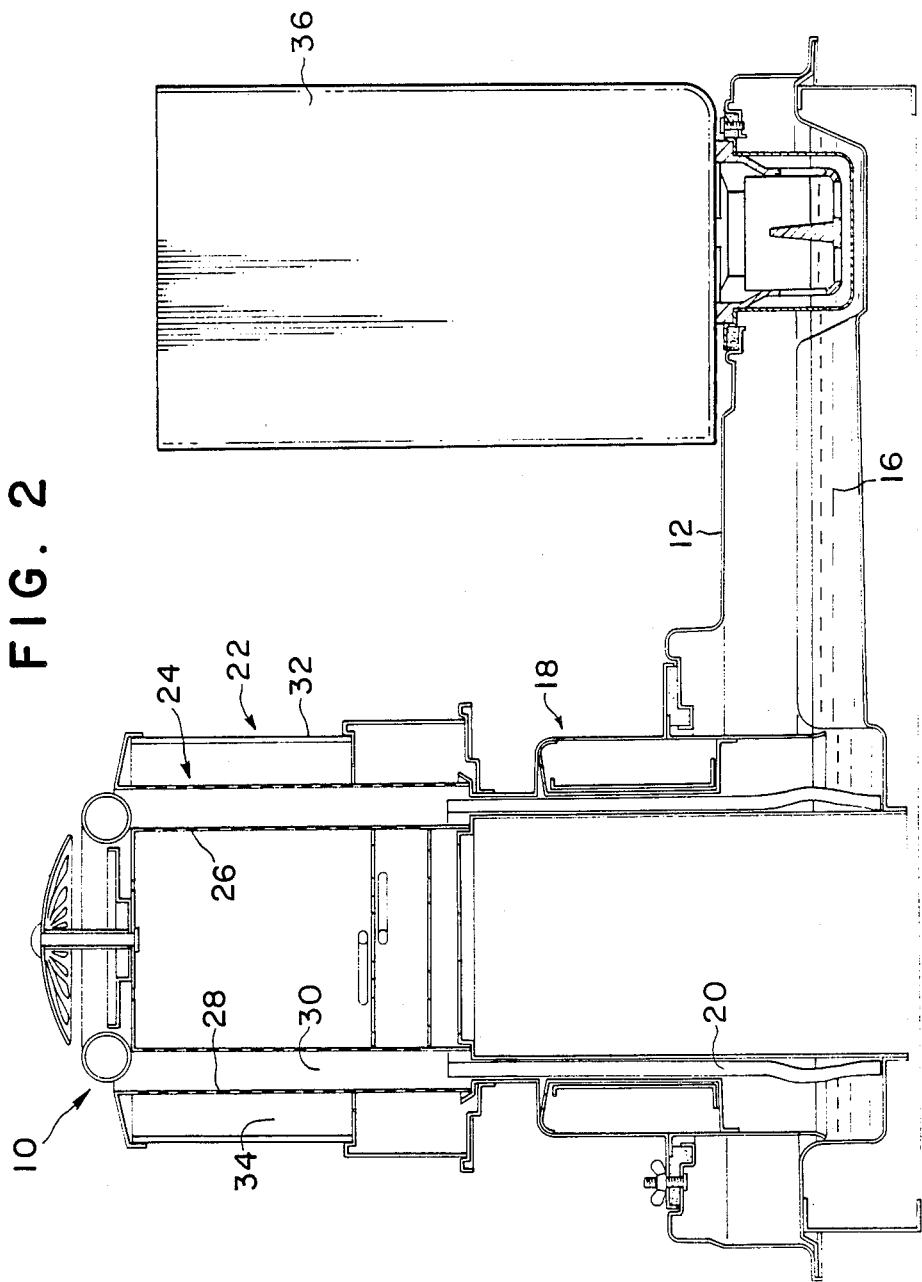
FIG. 2 is a vertical sectional view showing an oil burner which is an example of an appliance for which oil gauge for a cartridge-type oil burner according to the present invention is adapted to be used.

FIG. 2 illustrates an example of use of a cartridge-type oil tank for which an oil gauge according to the present invention is to be used, wherein the oil tank is used for an oil burner and more particularly an oil-fired space heater of a wick-ignition type. However, as described above, a cartridge-type oil tank for which an oil gauge according to the present invention is used is not limited to the use for an oil burner.

Prior to describing an oil gauge for an cartridge-type oil tank according to the present invention, an oil burner shown in FIG. 2 will now be briefly described.

An oil burner generally indicated by reference numeral 10 in FIG. 2 is constructed in a manner conventionally known in the art. The oil burner 10 is of the wick ignition type and includes an oil reservoir 12 for storing fuel oil 16 such as kerosene therein and a wick receiving case 18 communicating with the oil reservoir 12. In the wick receiving case 18, a wick 20 is received so as to be vertically moved through a wick moving mechanism (not shown).

On the wick receiving case 18 is disposed a combustion cylinder construction which is generally indicated by reference numeral 22 and includes a double combustion cylinder 24 comprising an inner cylindrical member 26 and an outer cylindrical member 28 with a space 30 being defined therebetween. The construction 22 also includes a heat-permeable cylinder 32 which is arranged to surround the double combustion cylinder 24 to define a space 34 therebetween. In the so-constructed combustion cylinder, when the wick 20 is raised at an upper end thereof to a lower portion of the space 30 and ignited, combustion takes place in the spaces 30 and 34 to red-heat the inner and outer cylindrical members 26 and 28, so that heat rays may be emitted therefrom and discharged through the heat-permeable cylinder 32 to the exterior.

In the example of the oil burner shown in FIG. 2, a cartridge-type oil tank 36 in which an oil gauge according to the present invention is to be incorporated is invertedly supported on the oil reservoir 12 so as to communicate with the oil reservoir 12 during the use. When oil is fed to the tank 36, it is erected.

Figure 3A:
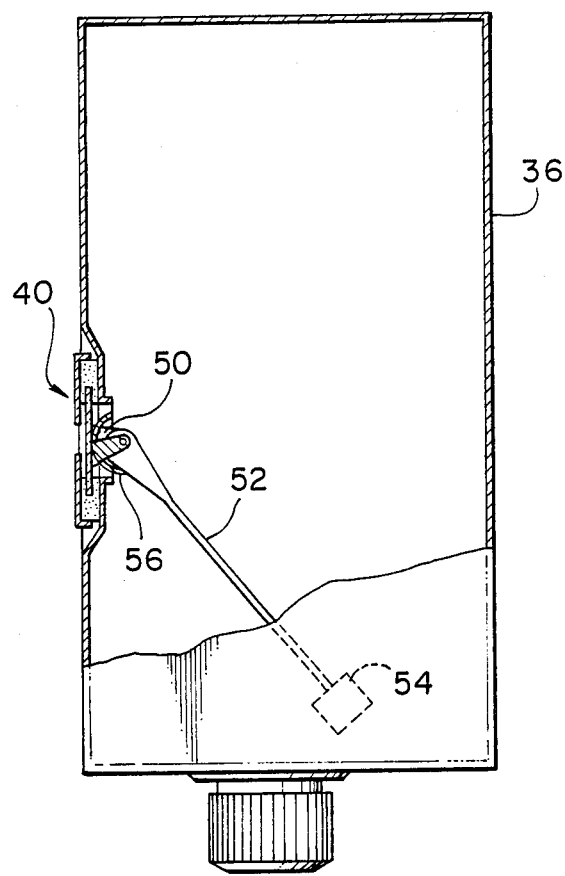
FIG. 3A is a side sectional view showing an embodiment of an oil gauge for a cartridge-type oil tank according to the present invention, in which the cartridge-type oil tank is inverted for use and substantially empty.
Figure 3B:
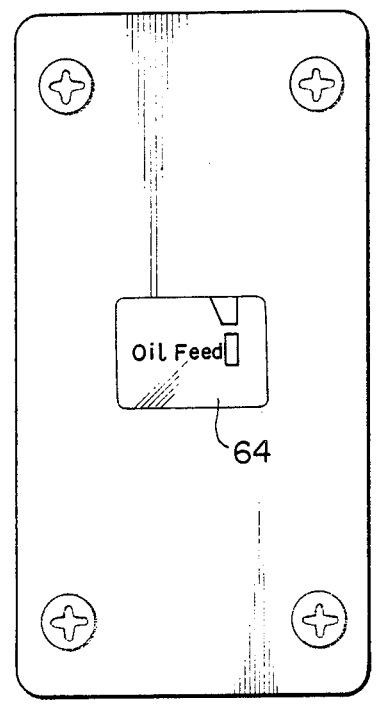
FIG. 3B is an enlarged front view of the oil gauge shown in FIG. 3A.
Figure 6A:
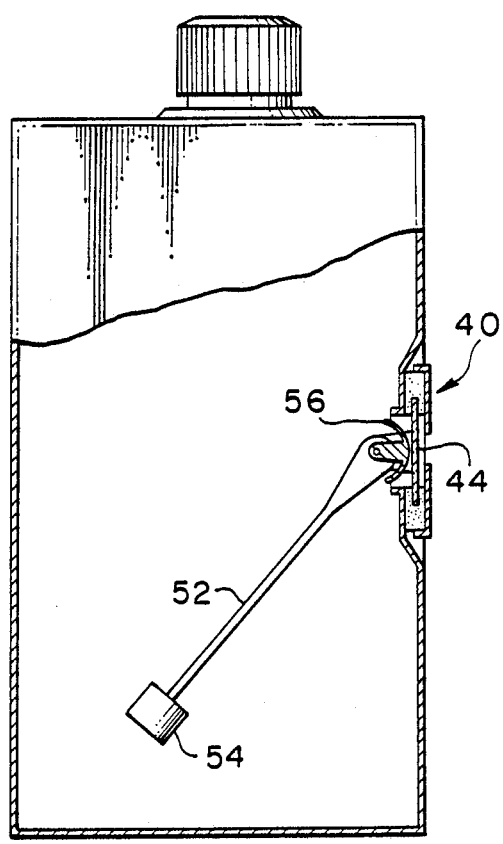
FIG. 6A is a front view of the oil gauge shown in FIG. 3A in which the cartridge-type oil tank is erected for feeding oil thereto and substantially empty.

FIGS. 3A to 3B illustrate an embodiment of an oil gauge for a cartridge-type oil tank according to the present invention. An oil gauge of the illustrated embodiment is generally indicated by reference numeral 40. FIG. 3A shows a cartridge-type oil tank 36 which has been substantially empty during the use, FIG. 4A show the cartridge-type oil tank 36 which is filled with fuel oil and invertedly arranged, and FIG. 6A shows the cartridge-type oil tank 36 which is erected for oil to be feed thereto.

Figure 4A:
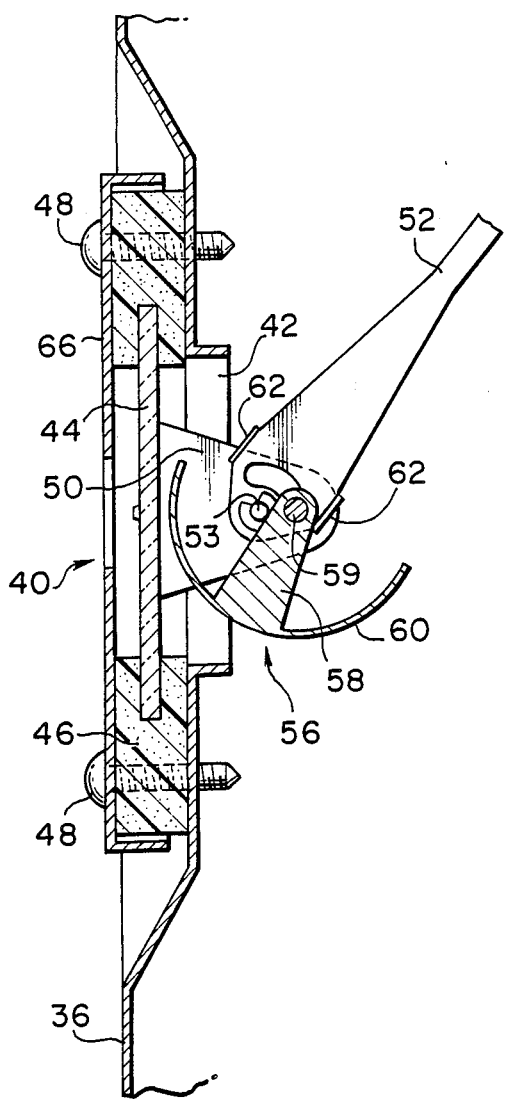
FIG. 4A is an enlarged side sectional view of the oil gauge shown in FIG. 3A in which the cartridge-type oil tank is substantially filled with oil.

The oil gauge 40, as shown in FIG. 4A, is arranged on a side wall of the cartridge-type oil tank 36. More particularly, the cartridge-type oil tank 36 is formed at a substantially central portion of a side wall thereof with an opening 42. The opening 42 is covered with a transparent cover plate 44, which is sealing mounted on the side wall of the tank 36 through a sealing member 46 such as a packing by means of screws 48. The transparent cover plate 44 may be formed of a suitable material such as plastic or the like. On an inner surface of the transparent plate 44 is securely mounted a gauge base 50, which, in the illustrated embodiment, comprises a plate member which is formed into a substantially triangle shape and arranged in a manner such that its apex projects inwardly. The gauge base 50 may be formed integral with the cover plate 44. The oil gauge 40 also includes an arm rod 52 which is pivotally mounted at one end or a proximal end thereof on the gauge base 50 through a pin 53 so as to be pivotally moved about the pin 53 and provided at the other end or a distal end thereof with a float 54. Thus, the arm rod 52 is adapted to be pivotally moved about the pin 53 through the float 54 as a level of fuel oil in the cartridge-type oil tank 36 is varied.

The oil gauge 40 also includes an oil indicator 56, which is also pivotally mounted on the gauge base 50 so as to be pivotable by gravity like a pendulum. The oil indicator 56 may be mounted common to the arm rod 52 or through the pin 53 of the arm rod 52 on the gauge base 50. However, in the illustrated embodiment, it is mounted separate from the arm rod 52. More particularly, the oil indicator 56 is pivotally mounted separate from a position of the gauge base 50 on which the arm rod 52 is mounted, so that the indicator 56 may be moved at a small angle as compared with the arm rod 52. The oil indicator 56 includes a rod 58 which is pivotally mounted at one end or a proximal end thereof through a pin 59 on the gauge base 50 so as to be pivotally movable about the pin 59. The oil indicator 56 also includes an indicator body 60 mounted in a manner like a pendulum on the other end or a distal end of the rod 58. In the illustrated embodiment, the indicator body 60 is formed into an arcuate shape and mounted at a substantially central portion of an inner surface thereof on the rod 58. Thus, it will be noted that the oil indicator 56 is generally formed into a pendulum-like shape so as to be pivotally moved by gravity.

The arm rod 52 is provided with an actuation means 62 for pivotally moving the oil indicator 56. More particularly, the arm rod 52, as shown in FIG. 4A, is provided at two positions thereof apart from each other with a pair of stoppers 62. Correspondingly, the rod 58 of the oil indicator 56 is arranged in a manner to be interposed at a portion thereof between the stoppers 62, so that one of both sides of the rod 58 may be engaged with or abutted against corresponding one of the stoppers 62 of the arm rod 52. For this purpose, in the illustrated embodiment, the rod 58 of the oil indicator 56 is overlapped at the proximal end thereof with that of the arm rod 52 and the stoppers 62 are positioned on both sides of the arm rod 52 adjacent to the proximal end thereof. Thus, the oil indicator 56 is pivotally moved due to engagement of any one of both sides of the rod 58 with the corresponding stopper 62 as the arm rod 52 is pivotally moved through the float 54 depending on a variation in a level of fuel oil in cartridge-type oil tank 36.

Figure 4B:
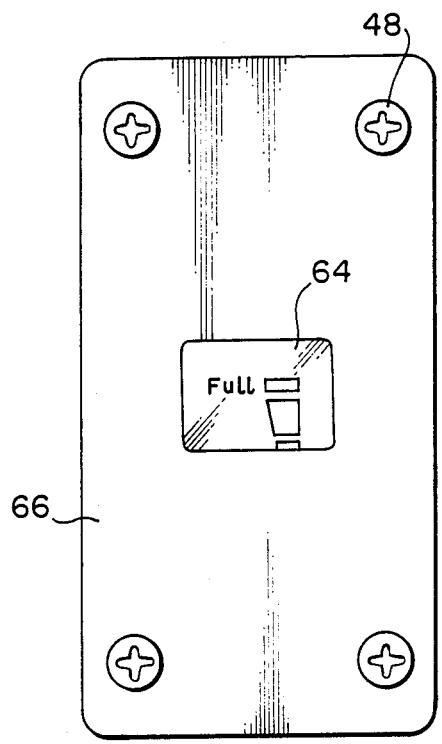
FIG. 4B is a front view of the oil gauge shown in FIG. 4A.
Figure 5:
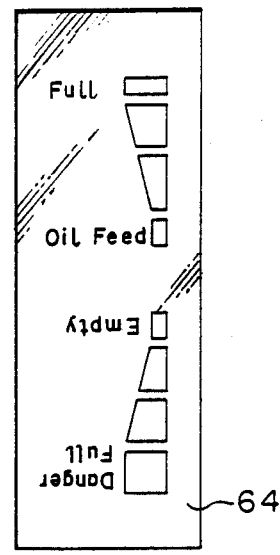
FIG. 5 is a view showing an indication means.
Figure 6B:
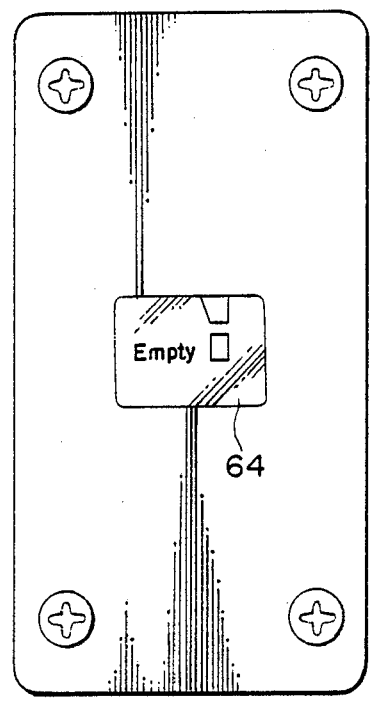
FIG. 6B is an enlarged front view of the oil gauge shown in FIG. 6A.

The indicator body 60 of the oil indicator 56 is provided on an outer surface thereof with an indication means 64 which is adapted to variably indicate the amount of fuel oil stored in the cartridge-type oil tank depending on a variation in a level of oil in the cartridge-type oil tank 36. The indication means 64 may comprise a scale formed on an adhesive seal, an adhesive label or the like, which may be made in such a manner as shown in FIG. 5 in view of a direction of the cartridge-type oil tank 36, a level of fuel oil varied in the tank and the like. Thus, when the cartridge-type oil tank 36 is filled with fuel oil and then is invertedly arranged for use as shown in FIG. 4A, the indication means 64 of the oil indicator 56 carries out such an indication as shown in FIG. 4B. When the oil tank 36 has been empty during the use as shown in FIG. 3A, the indication by the indicator 56 is as shown in FIG. 3B. Further, when oil feed to the empty tank is started as shown in FIG. 6A, the indication means 64 carries out such an indication as shown in FIG. 6B.

In FIG. 4A, reference numeral 66 designates a holding member.

In the oil gauge of the illustrated embodiment, as described above, the gauge base 50, the arm rod 52 mounted on the gauge base 50 and provided with the float 54, and the oil indicator 56 mounted on the gauge base 50 are inserted through the opening 42 of the cartridge-type oil tank 36 therein, and then the opening 42 is airtightly sealed with the transparent cover plate 44. Accordingly, the illustrated embodiment permits the oil gauge to be arranged in the oil tank in substantially the same manner as the conventional one shown in FIG. 1, so that entrance of air through the opening 42 of the cartridge-type oil tank 36 into the tank may be effectively prevented although the the oil gauge of the embodiment is of the type utilizing a float.

Also, the oil gauge of the illustrated embodiment is so constructed that the arm rod 52 provided with the float 54 and the indicator body 60 provided with the indication means or scale 64 are actuated in association with each other due to engagement between the stoppers 62 of the arm rod 52 and the rod 58 of the oil indicator 56, and the rod 58 of the oil indicator 56 is engaged with any one of the stoppers 62 at different positions depending on a level of fuel oil in the cartridge-type oil tank 36 and a direction of the tank. Such construction allows the amount of oil in the cartridge-type oil tank both during use of the tank and when oil is to be fed to the tank to be quantitatively known by observing the scale 64 through the transparent cover plate 44.

As can be seen from the foregoing, the present invention keeps the opening of the cartridge-type oil tank airtight to prevent leakage of fuel oil from the tank. Also, the present invention quantitatively displays the amount of oil in them cartridge-type oil tank with high accuracy both during use of the tank and during oil. thereto although the oil gauge of the present invention is the type of utilizing a float. Accordingly, the present invention effectively prevents various kinds of danger encountered with use of the conventional oil gauge such as fire due to leakage of full oil from the cartridge oil tank, operation of an oil burner without supply of fuel oil from the tank, overflow of oil from the tank during oil feed thereto, and the like.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. An oil gauge for a cartridge-type oil tank which is arranged in the oil tank through an opening formed at a substantially central portion of a side wall of said cartridge-type oil tank to quantitatively indicate the amount of oil in said cartridge-type oil tank, comprising:
   a transparent cover plate arranged on said side wall of said cartridge-type oil tank so as to airtightly cover said opening of said cartridge-type oil tank;
   a gauge base mounted on an inside of said cover plate;
   an arm rod pivotally mounted at a proximal end thereof on said gauge base and provided at a distal end thereof with a float;
   an oil indicator pivotally mounted at one end thereof on said gauge base and provided with an indication means for quantitatively indicating the amount of oil in said cartridge-type oil tank depending on a level of oil in said cartridge-type oil tank; and
   two actuation members provided one on each side of said arm rod for engaging said oil indicator so that one of said actuation members pivotally varies the position of said oil indicator depending on a variation in the level of oil when said oil tank is in a working position and the other of said actuation members pivotally varies the position of said oil indicator depending on a variation in the level of oil when said oil tank is in an oil feed position which is inverted relative to said working position, such that said indication means indicates a corresponding level of oil in said oil tank irrespective of said positions of said oil tank.

2. An oil gauge as defined in claim 1, wherein said oil indicator has a pendulum-like shape and comprises a rod pivotally mounted at a proximal end thereof on said gauge base and an indicator body of an arcuate shape mounted on the other end of said rod.

3. An oil gauge as defined in claim 2, wherein said indication means is provided on an outer surface of said indicator body.

4. An oil gauge as defined in claim 3, wherein said indication means comprises a scale.

5. An oil gauge as defined in claim 2, wherein said actuation members comprise two stoppers arranged on opposite sides of said arm rod adjacent to said proximal end thereof, said rod of said oil indicator being interposed at a portion thereof adjacent to its proximal end between said two stoppers so that one of said stoppers engages said rod of said oil indicator in said working position and the other of said stoppers engages said rod of said oil indicator in said oil feed position.

6. An oil gauge as defined in claim 1, wherein said gauge body is formed integral with said transparent cover plate.

7. An oil gauge as defined in claim 1, wherein said oil indicator is mounted on said gauge body separately from said arm rod.

8. An oil gauge for a cartridge-type oil tank which is arranged in said cartridge-type oil tank through an opening formed at a substantially central portion of a side wall of said cartridge-type oil tank to quantitatively indicate the amount of oil in said cartridge-type oil tank, comprising:

a transparent cover plate arranged on said side wall of said oil tank so as to airtightly cover said opening of said cartridge-type oil tank;

a gauge base mounted on an inside of said cover plate;

an arm rod pivotally mounted at a proximal end thereof on said gauge base and provided at a distal end thereof with a float, so that it may be pivotally moved through said float depending on a variation in a level of oil in said cartridge-type oil tank;

an oil indicator having a pendulum-like shape and comprising a rod pivotally mounted at a proximal end thereof on said gauge base and an indicator body of an arcuate shape mounted on a distal end of said rod and provided on an outer surface thereof with a scale for quantitatively indicating the amount of oil in said cartridge-type oil tank depending on a level of oil in said cartridge-type oil tank; and, a pair of stoppers provided on opposite sides of a portion of said arm rod adjacent to said proximal end thereof;

said rod of said oil indicator being interposed at a portion thereof adjacent to said proximal end thereof between said stoppers such that one of said stoppers engages said rod of said oil indicator to pivotally vary a position of said oil indicator depending on a variation in the level of oil in said cartridge-type oil tank when said oil tank is in a working position and the other of said stoppers engages said rod of said oil indicator to pivotally vary the position of said oil indicator depending on a variation in the level of the oil when said oil tank is in an oil feed position which is inverted relative to said working position, such that said indication means indicates a corresponding level of oil in said oil tank irrespective of said positions of said oil tank.

* * * * *